United States Patent [19]

Shulzhenko et al.

[11] 4,123,504

[45] Oct. 31, 1978

[54] METHOD OF MAKING DIAMONDS SYNTHETICALLY

[76] Inventors: Alexandr A. Shulzhenko, Novo-Konstantinovskaya, 17, kv. 27; Anatoly F. Getman, Syretskaya, 38, kv. 2, both of Kiev, U.S.S.R.

[21] Appl. No.: 784,593

[22] Filed: Apr. 4, 1977

Related U.S. Application Data

[60] Continuation of Ser. No. 683,705, May 6, 1976, abandoned, which is a continuation of Ser. No. 582,461, May 28, 1975, abandoned, which is a continuation of Ser. No. 464,431, Apr. 25, 1974, abandoned, which is a division of Ser. No. 292,396, Sep. 26, 1972, Pat. No. 3,906,082, which is a continuation of Ser. No. 68,006, Aug. 28, 1970, abandoned.

[51] Int. Cl.$^2$ ............................................. C01B 31/06
[52] U.S. Cl. ..................................................... 423/446
[58] Field of Search ........................................... 423/446

[56] References Cited

U.S. PATENT DOCUMENTS

| | | | |
|---|---|---|---|
| 3,148,161 | 9/1964 | Wentorf et al. | 423/446 |
| 3,442,616 | 5/1969 | Wakatsuki et al. | 423/446 |
| 3,488,153 | 1/1970 | Bundy | 423/446 |
| 3,906,082 | 9/1975 | Schulzhenko et al. | 423/446 |

FOREIGN PATENT DOCUMENTS

| | | | |
|---|---|---|---|
| 698,804 | 12/1964 | Canada | 423/446 |

OTHER PUBLICATIONS

Armagnac "Popular Science" vol. 197, No. 3, 1970, pp. 82, 83, 134, & 135.

*Primary Examiner*—Edward J. Meros
*Attorney, Agent, or Firm*—Holman & Stern

[57] ABSTRACT

A method of diamond synthesis, by which a reaction mixture is prepared comprising, taken in direct contact, a carbon-containing material and a combination of components selected from the group containing silver chloride, calcium carbonate, calcium oxide and from a group containing aluminium and boron. Then the reaction mixture is subjected to the action of a temperature of at least about 1800° C and a pressure corresponding to a selected temperature within the diamond stable region during the time required for forming a diamond.

1 Claim, No Drawings

METHOD OF MAKING DIAMONDS SYNTHETICALLY

This is a continuation of application Ser. No. 683,705 filed May 6, 1976, now abandoned, which in turn is a continuation of application Ser. No. 582,461, filed May 28, 1975, now abandoned, which in turn is a continuation of application Ser. No. 464,431 filed Apr. 25, 1974, now abandoned, which in turn is a division of application Ser. No. 292,396, filed Sept. 26, 1972, now U.S. Pat. No. 3,906,082, which in turn is a continuation of application Ser. No. 68,006, filed Aug. 28, 1970, now abandoned.

The present invention relates to processes of production of superhard materials and, more particularly, the invention relates to methods of making diamonds synthetically.

Known in the art is a method of diamond synthesis, according to which a carbonaceous material in the presence of metals is subjected to the action of a temperature of at least about 1800° C. and a pressure corresponding to a selected temperature within the diamond stable region during a time required for its crystallization.

For example, a method of making diamonds synthetically is known (proposed by O. I. Leipunsky in 1939, "Progress in Chemistry", Vol. 8, No. 10, pp 1519–1534) by which graphite is processed in conjunction with a medium (solvent), e.g., iron, at a pressure of higher than 45 kbar and a temperature exceeding 1500° K. (1227° C.). Later, a method of diamond synthesis was proposed, in which the medium consists of metals or alloys selected from the following elements: Ni, Co, Fe, Mn, Cr, Ta, Ru, Rh, Pd, Os, Jr, Pt. The synthesis is effected at pressures exceeding 50 kbar and a temperature exceeding 1200° C. (U.S. Pat. Nos. 2,947,609, 2,947,610 and 2,947,611).

The diamonds produced by the known methods contain a large amount of metallic inclusions. The quantity of impurities in the diamonds may be as high as 4%.

An object of the present invention is to provide a method of making diamonds synthetically, which would ensure production of diamonds having a minimum amount of impurities.

Another object of the invention is to provide a method of making diamonds synthetically, which would make it possible to produce transparent crystals.

Still another object of the invention is to make it possible to produce diamonds having an octahedron crystal habit.

These and other objects have been attained, according to the present invention, by providing a method of making diamonds synthetically, by which a carbonaceous material in the presence of metals is subjected to the action of a temperature of at least about 1800° C. and a pressure corresponding to a selected temperature within the diamond stable region during a time sufficient for forming a diamond, characterized in that in conjunction with the carbonaceous material and in direct contact therewith subjected to the above-stated action are components taken in combination, one of which comprises at least one compound containing silver chloride, calcium carbonate, calcium oxide, while the other component comprises at least one of the elements selected from the group containing aluminium and boron.

This ensures high purity of the produced diamond.

For carrying the proposed invention into effect, graphite and other carbonic materials can be used as the carbonaceous material which, when subjected to high temperature and pressure, liberate free carbon which is capable of transforming into diamond.

The best results were obtained when spectrally-pure graphite was used as a carbonaceous material.

The reaction compound may consist of a mixture of powders of spectrally-pure graphite and a combination of components one of which comprises at least one compound selected from the group containing silver chloride, calcium carbonate and calcium oxide, while the other component comprises one of the elements selected from the group containing aluminium and boron.

The proportion between the carbonaceous material and the above-said combination of components is not a decisive factor for carrying the proposed invention into effect.

The above-mentioned reaction compound is placed into a high-pressure high-temperature device of any known type capable of providing pressure and temperature required for the synthesis of diamond.

For example, for this purpose a device can be used which has a cylindrical reaction space and a base adjoining members of a hard alloy or steel, while the lateral surface is made of a material featuring heat and electro-insulating properties, e.g., pyrophylite.

The heating of the reaction compound under pressure can be effected by any known method, for example by using a special graphite heater fed with an electric current.

The pressure in the high-pressure device is determined by a known method by measuring changes in the electric resistance under pressure of such metals as bismuth ($Bi_{II-III}$ - 27 kbar, $Bi_{III-V}$ - 89 kbar), thallium ($Tl_{II-III}$ - 3 kbar), barium ($Ba_{I-II}$ - 59 kbar).

The accuracy of measuring the pressure in the high-pressure device at a temperature of 20° C. was within ±6 kbar.

The temperature in the high-pressure device is determined by the melting points of such metals as manganese, nickel, titanium, platinum.

The accuracy of measuring the temperature in the high-pressure device at a pressure therein about 80 kbar is within ±100° C.

The present invention is carried into effect as follows.

EXAMPLE 1

A homogeneous mixture of powders of spectrally-pure graphite, Al and $CaCO_3$ in a voluminal ratio of 1:1:1 was placed into a heater made of spectrally-pure graphite and was covered at both sides by disks of spectrally-pure graphite. Then the mixture was subjected to the action of a pressure of up to 95 kbar and a temperature of about 2100° C. and was held under these conditions during 3 min. After that the pressure and temperature were reduced to normal values, and the diamonds were removed. 10 experiments were carried out under these conditions. In each case synthesized diamonds were discovered.

EXAMPLE 2

The experiment was conducted under the same conditions as in Example 1 but a mixture of Al and AgCl was used as a solvent. 17 experiments were conducted. In each case diamonds were discovered.

EXAMPLE 3

The experiment was conducted under the same conditions as those stated in Example 1 but a mixture of B and AgCl was used as a solvent. 5 experiments were conducted. In each case diamonds were discovered.

EXAMPLE 4

Disks of spectrally-pure graphite and disks of a mixture of Al+ $CaCO_3$ + Bi were placed into a graphite heater layer-by-layer and were subjected to the action of a pressure of up to 89 kbar and a temperature of about 2200° C. and were held under these conditions during 10 min. After that the pressure and temperature were released and the diamonds were removed. 3 experiments were conducted. In each case diamonds were discovered.

EXAMPLE 5

The experiment was conducted under the same conditions as in Example 1, but instead of $CaCO_3$ there was used CaO. 5 experiments were conducted. In each case diamonds were discovered.

EXAMPLE 6

A homogeneous mixture of spectrally-pure graphite, Al and CaO in a voluminal ratio of 2:1:1 was placed into a heater of spectrally-pure graphite and covered at both sides by disks of spectrally-pure graphite. Then the mixture was subjected to the action of a pressure of up to 85 kbar and a temperature of up to 1900° C., and was held under these conditions during 3 min. 10 experiments were conducted under the above conditions. In each case diamonds were discovered.

The diamonds produced by the method according to the present invention contained about 0.15% of impurities.

We claim:

1. A method of making diamonds synthetically, comprising the steps of: preparing a reaction mixture comprising a carbonaceous material and a combination of components one of which comprises calcium carbonate, while the other component includes at least a single element selected from a group consisting of aluminum and boron; and subjecting said reaction mixture to a temperature of at least about 1800° C. and a pressure corresponding to a selected temperature within the diamond stable region during the time required for forming a diamond.

* * * * *